United States Patent [19]

Guif et al.

[11] 4,145,717
[45] Mar. 20, 1979

[54] SUBSCRIPTION TV AUDIO CARRIER RECOVERY SYSTEM

[75] Inventors: Stanley E. Guif; Terry L. Nimmer; Donald A. Weigt, all of Madison; Glenn Wolenec, Cross Plains; Richard C. Gall, Middleton, all of Wis.

[73] Assignee: Oak Industries Inc., Crustal Lake, Ill.

[21] Appl. No.: 795,725

[22] Filed: May 11, 1977

[51] Int. Cl.² ............................................. H04N 1/44
[52] U.S. Cl. ................................. 358/121; 358/118; 358/120; 358/122
[58] Field of Search ................. 358/118, 120–122; 328/16, 19, 20

[56] References Cited

U.S. PATENT DOCUMENTS

| 3,081,376 | 3/1963 | Loughlin et al. | 358/120 |
| 3,184,537 | 5/1965 | Court et al. | 358/120 |
| 4,002,825 | 1/1977 | Lewis | 358/123 |
| 4,024,575 | 5/1977 | Harney et al. | 358/121 |
| 4,064,536 | 12/1977 | Saeki et al. | 358/121 |

OTHER PUBLICATIONS

J. Markus; *Guidebook of Electronic Circuits*, Mar. 1975, CH. 39, McGraw-Hill; AU 222.

*Primary Examiner*—S. C. Buczinski
*Attorney, Agent, or Firm*—Kinzer, Plyer, Dorn & McEachran

[57] ABSTRACT

A subscription TV decoder for processing encoded audio and video signals in which the TV program audio information is received as an audio subcarrier includes means for decoding the video signal, a filter for separating the decoded video and audio signals, and a filter for separating the audio signal from the audio information subcarrier. The audio information subcarrier is multiplied to raise it to the frequency of the audio signal and is then recombined with the decoded video signal.

11 Claims, 3 Drawing Figures

SUBSCRIPTION TV AUDIO CARRIER RECOVERY SYSTEM

SUMMARY OF THE INVENTION

The present invention relates to televison decoders and in particular to a decoder in which the audio information is received as an audio subcarrier.

A primary purpose of the invention is a TV decoder for use in subscription television in which the audio information is transmitted on an audio subcarrier and in which the audio signal has either no or incorrect program information thereon.

Another purpose is a TV coding system for use in subscription television in which the audio program information and the decoder enabling signals are transmitted on audio subcarriers.

Another purpose is a TV decoder for use in decoding amplitude modulated encoded television signals, in which the audio signal provides the video decoding and in which the audio program information is received on an audio subcarrier.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention has utility in the field of over-the-air pay television and is particularly directed to a means for decoding and converting an encoded television signal at the subscriber's location. The encoded television signal not only carries signal means for effecting decoding, but also includes certain data information for enabling the decoding apparatus.

The instrument, which will be connected at the subscriber's location, preferably to the VHF input of the television set, receives through the subscriber's TV UHF antenna, a television channel assigned to the pay system. As described herein, channel 52 is the broadcast channel, however, it should be understood this is merely for purposes of explanation. The received video information may be encoded prior to transmission in the manner described in copending U.S. patent application Ser. No. 573,046, filed Apr. 30, 1975, now Pat. No. 4,024,575 assigned to the assignee of the present application. The sine wave encoding described in said application is applied to both the audio and the video, however, since the audio is an FM signal and the encoding is amplitude modulation, it has no direct encoding effect. Accordingly, the premium program audio signal is transmitted on a special audio subcarrier. The amplitude modulation on the audio carrier is used as a means for providing a decoding signal for the encoded video signal. The program audio signal, which as described is transmitted on a special subcarrier, along with a data subcarrier, is also decoded by the described unit. The audio subcarrier is rendered acceptable for the television set by the described decoder and the data subcarrier is used to enable the decoding apparatus. As described herein, VHF channel 6 is used as the television receiver channel.

As described in the above-mentioned copending application, the televised signal is encoded at the transmitter by the application of a sine wave as additional modulation to the composite television signal. For example, an encoding sine wave having a frequency of approximately 15.75 KHz is applied directly to the television signal. The sine wave is phase locked to the horizontal sync which has the effect of suppressing the horizontal sync and enhancing the video between horizontal sync pulses. The level or amplitude of the encoding is greater on the audio carrier than it is on the video carrier. The detected audio carrier encoding signal is combined with the coded video signal in the described circuitry resulting in a clean video output signal usable in a television receiver.

Figure 1:
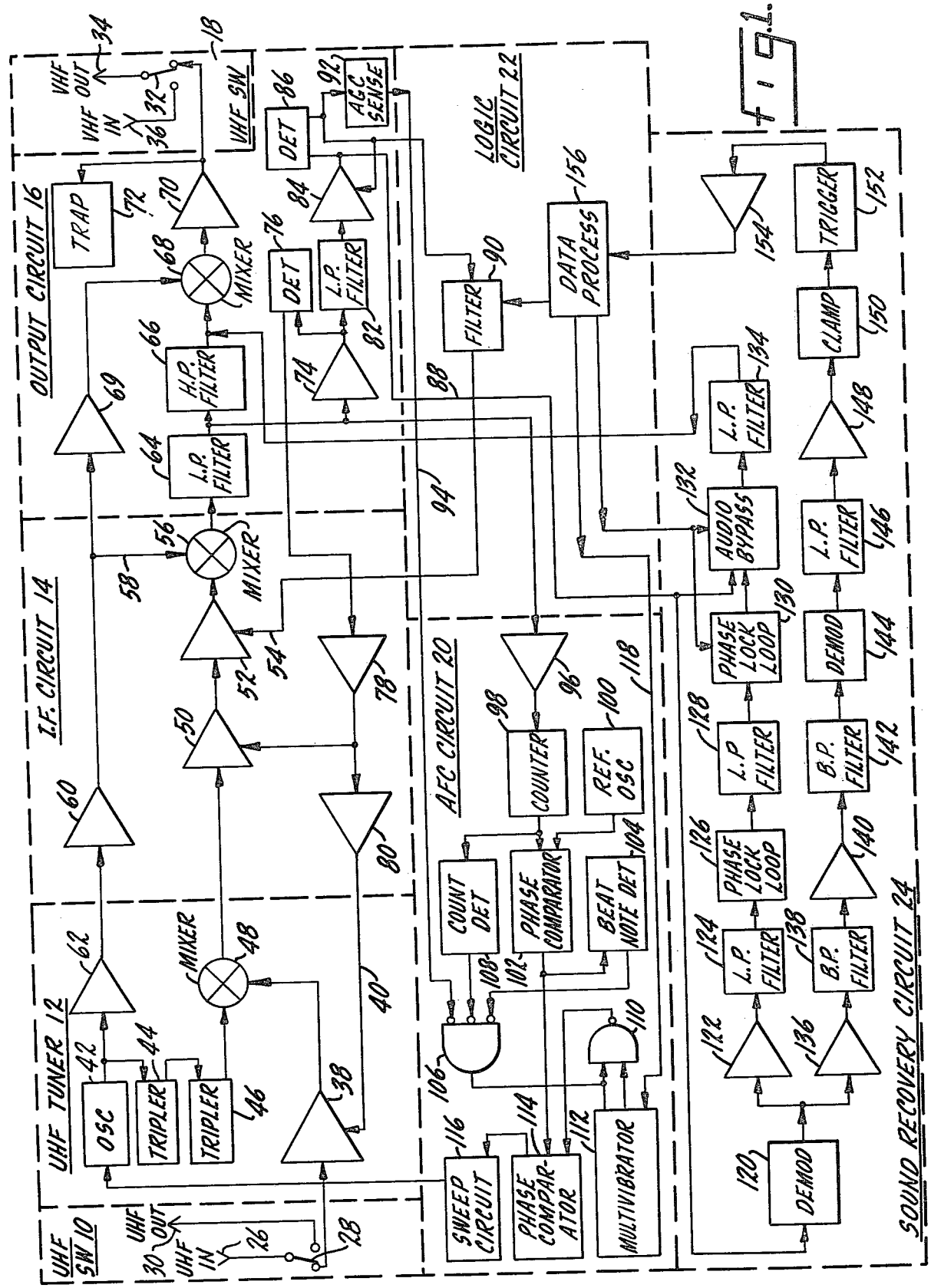
FIG. 1 is a schematic illustration of the converter decoder disclosed herein.

The overall converter-decoder is illustrated in FIG. 1 and includes a number of interconnected separate stages. Beginning at the receiving end, there is a UHF switch section 10, a UHF tuner section 12, an IF circuit 14, an output circuit 16, a VHF switch 18, an AFC circuit 20, a logic circuit 22 and a sound recovery circuit 24.

The incoming television signal will be received on UHF antenna 26 and assuming switch 28 is in the position shown, this signal will be passed to UHF tuner 12. If switch 28 is in the opposite position, most of the incoming signal will be directed to UHF output terminal 30 which is directly connected to the television receiver. A small amount of the incoming signal is directed to UHF tuner 12 allowing data reception while the decoder is set for normal reception. Switch 28 operates with VHF switch 32 so that when switch 32 is in the position shown the VHF terminal of the television set, indicated at 34, is connected to the converter-decoder. When switch 32 is in the opposite position, VHF antenna 36 will be connected to the VHF terminal of the television set. Thus, the subscriber may either switch the decoder into an operative position or may bypass it to receive normal over-the-air or cable programming.

In UHF tuner 12 there is an RF amplifier 38 which in the illustrated example is tuned to channel 52 having a video carrier at 699.25 MHz and an audio carrier at 703.75 MHz. Amplifier 38 receives automatic gain control over line 40 in a manner to be described hereinafter. A voltage controlled oscillator 42 at 88 MHz in the illustrated example is connected to a tripler 44 having an output of 264 MHz and a second tripler 46 having an output of 792 MHz. The output of tripler 46 and amplifier 38 are connected to a mixer 48 which provides a video IF output of 92.75 MHz and an audio IF of 88.25 MHz.

Mixer 48 is connected to an IF amplifier 50 which also receives an AGC control signal over the AGC network. Amplifier 50 is connected to a decoding amplifier 52 which receives a decoding signal on line 54 with the decoding signal being provided by the circuitry to be described hereinafter. The decoding process is substantially as described in the above-mentioned copending application. The output of amplifier 52 is connected through a mixer 56 which receives an 88 MHz signal on line 58 connected through local oscillator buffer amplifiers 60 and 62 to oscillator 42. The output of mixer 56 is a 4.75 MHz video signal and a 250 KHz audio signal.

The described audio and video outputs from mixer 56 are connected to a 10 MHz low pass filter 64, the input to output circuit 16, and from there to a 500 KHz high pass filter 66. The output from filter 66 is the 4.75 MHz video signal, the audio signal having been removed by the filter. The video signal is connected to a mixer 68 which also receives the 88 MHz amplified signal from oscillator 42 through local oscillator buffer amplifier 69. Also connected to the input of mixer 68 is the reconstituted audio signal which will be described hereinafter. The outputs from mixer 68 are the decoded video and sound signals for channel 6 at 83.25 MHz and 87.75 MHz, respectively. Amplifier 70 increases the strength of the channel 6 signal from mixer 68. An 88 MHz crystal trap 72 removes the local oscillator 88 MHz signal and the resultant interference from channel 6. Channel 6 audio and video signals are supplied to switch 32 and then to the VHF input of the subscriber television set.

The output from filter 64 is connected to a 0–6 MHz amplifier 74 which is connected to an amplitude modulation detector 76 which detects the level of the video signal as it is the largest signal at the amplifier output. Detector 76 is connected to AGC amplifiers 78 and 80 which supply the AGC signals for RF amplifier 38 and IF amplifier 50.

The output from amplifier 74 is also connected to a 500 MHz low pass filter 82 whose output is the 250 KHz audio signal which is passed to amplifier 84. The output from amplifier 84 is connected to an amplitude modulation detector 86, which is in an AGC loop with amplifier 84. Amplifier 84 also provides a signal to the sound recovery circuit 24 (along line 88). The output from detector 86 is connected to a 15.75 KHz filter 90 on logic circuit 22. The output from filter 90, which is the decoding sine wave, is connected to decoding amplifier 52 in the IF circuit. The described AGC loop further includes an AGC sensing circuit 92 having an input from detector 86 and an output connected along line 94 to AFC circuit 20.

The input for AFC circuit 20 is a 4.75 MHz amplifier 96 which receives its input from the output of 10 MHz low pass filter 64. Amplifier 96 effectively removes the modulation so that the carrier frequency of the video signal can be counted in a divide by 16 counter 98 which is connected to the amplifier output. The output from counter 98 along with the output from a reference 296.875 KHz crystal oscillator 100 is connected to a phase comparator 102, which will determine the frequency deviation between the video carrier and reference signal. A beat note detector 104 is connected to the output of phase comparator 102. The beat note detector may have a low pass filter at its input to eliminate both the crystal oscillator frequency and the video signal with the result that the detector will receive an AC component below about 50–75 KHz and above about 4 KHz. When the video signal is at the correct frequency the beat note detector should see a zero frequency signal. The output from the beat note detector is connected to a phase comparator control gate 106 which also receives a signal from count detector 108 and the signal along line 94 from AGC sense circuit 92. Thus, the input information to gate 106 indicates the following: the beat note detector indicates either that the video signal is on frequency or that there is no video signal at all; the count detector indicates that in fact there is a video signal; the AGC signal indicates that the signal is in fact a video signal as there is an additional signal approximately 4.5 MHz different in frequency, or the audio signal. The output from gate 106 is connected to a gate 110 and a retriggerable one-shot multivibrator 112. Assuming there is an output from gate 106 which indicates that there is an on frequency video signal present, then gate 110 will turn on a three state phase comparator amplifier 114 which controls a sweep circuit 116 in turn connected to oscillator 42 in the UHF tuner circuit.

Thus, the output from gate 106 causes the sweep circuit to discontinue its sweeping function as the video signal is then at the correct frequency and there is no longer any necessity of varying the frequency of oscillator 42. The tri-state comparator amplifier 114 passes the output signal of phase comparator 102 through sweep circuit 116 to the 88 MHz oscillator 42. This phase comparator output, filtered by the sweep circuit, provides the AFC voltage to keep oscillator 42 phase locked. At the same time as gate 106 causes the described discontinuance of the sweeping operation, it applies power to retriggerable one-shot multivibrator 112. As long as multivibrator 112 does not time out, the circuit will remain in the described phase lock condition. However, if the multivibrator does time out, the circuit will revert back to a sweeping condition. Multivibrator 112 receives an additional input along line 118 from the logic circuit. This latter signal indicates to the multivibrator that the logic circuit is processing data messages, which logic signal is used as a trigger signal for the multivibrator operation. Thus, the described AFC circuit uses the video signal to provide automatic frequency control for the entire converter-decoder unit.

The input to sound recovery circuit 24 is the audio carrier signal derived from the output of amplifier 84 on output circuit 16. At this point the audio signal includes base band audio, if any is present, a data subcarrier at approximately 152 KHz and an audio subcarrier at 62½ KHz. The output from demodulator circuit 120 is connected to an amplifier 122 and then to a 90 KHz low pass filter 124. Thus, the data subcarrier is removed at this point and the 62½ KHz audio subcarrier is connected to a phase lock loop circuit 126. Circuit 126 provides a strong component at twice its input frequency and through the next stage, a 125 KHz low pass filter 128, the audio subcarrier is filtered and doubled and this signal is applied to a 125 KHz phase lock loop circuit 130. The output from circuit 130 will again be the second harmonic of the input and thus a 250 KHz audio signal is connected to audio bypass switch 132. Thus, one input to bypass switch 132 is the original audio subcarrier, carrying the appropriate sound signal for a premium program, multiplied by four to raise it to the audio carrier frequency of 250 KHz. Additional inputs to bypass switch 132 include the input audio carrier, from amplifier 84, and a bypass enable signal from data processing circuit 156. Depending upon the signal from logic circuit 22, the bypass switch will pass either the multiplied audio subcarrier, containing the true audio information, or the original audio carrier which will contain no usable audio information for the particular program. Thus, the logic circuit, in addition to controlling video decoding, controls whether or not the subscriber will receive the correct audio signal to accompany a decoded video signal. The output from bypass switch 132 is connected to a 325 KHz low pass filter 134 whose output in turn is connected to mixer 68 where it will be mixed and subsequently amplified and provided as the channel 6 audio signal.

The other path on sound recovery circuit 24 includes an amplifier 136 connected to a 152.88 KHz bandpass filter 138 which removes all signals other than the data subcarrier. Filter 138 is followed by an amplifier 140, a second bandpass filter 142 and a phase lock loop data demodulator circuit 144 whose output is connected to a 25 KHz low pass filter 146. The data information is then passed through an amplifier 148, a clamping circuit 150 and a Schmitt trigger circuit 152 to a buffer amplifier 154. The output from buffer amplifier 154, which is connected to data processing unit 156 in logic circuit 22, is a series of square wave pulses as described hereinafter.

Figure 3:
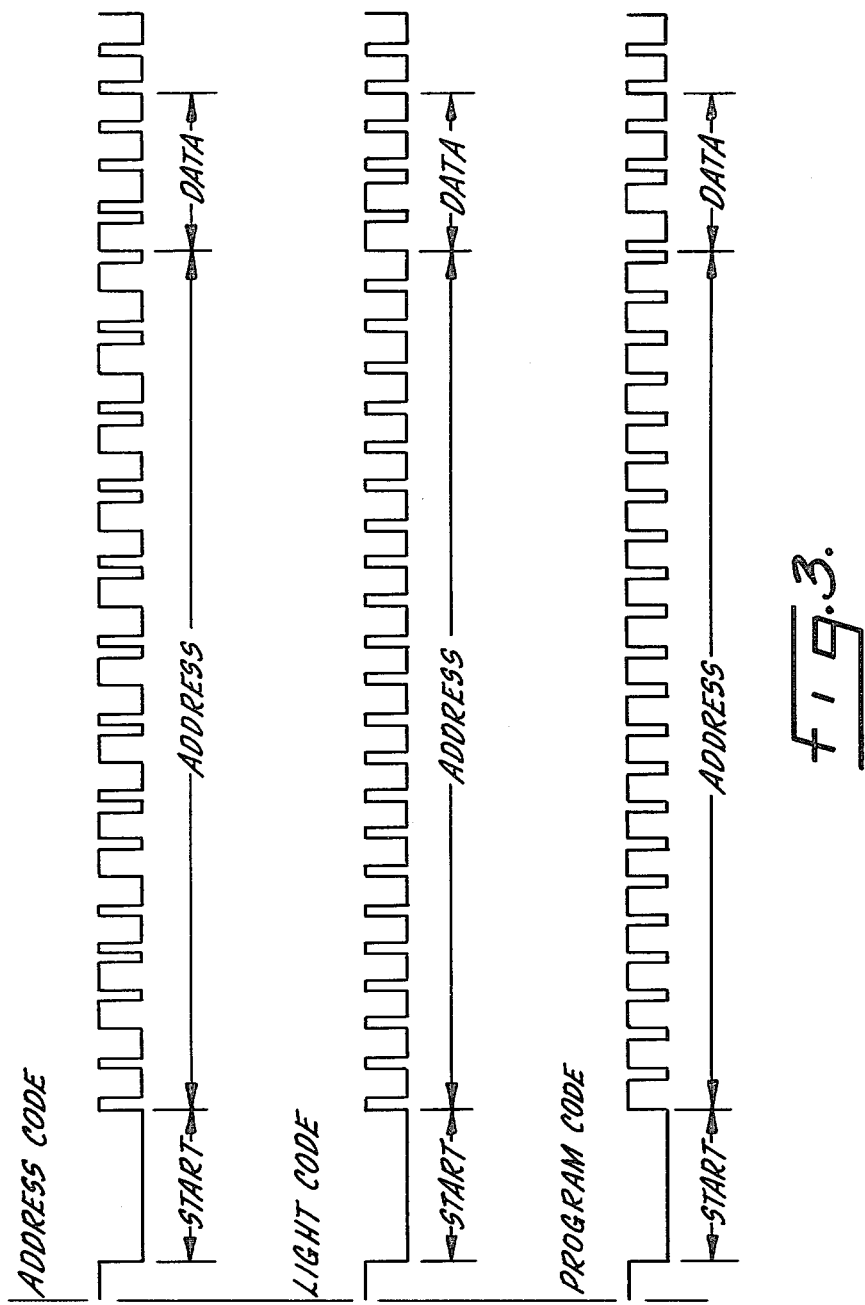
FIG. 3 is a wave form diagram illustrating the data information.

There are three types of messages which can be transmitted under the described decoding process. The message wave forms are illustrated in FIG. 3 and each begins with a four-bit wide start pulse followed by a 22-bit address and four data bits. A subscriber determines what type of programming he wishes to receive, and since there are four data bits, there are four available levels of premium programming which he can receive through the described decoder. The specific customer is addressed and appropriate data is transmitted and stored in the decoder memory. This operation may take place any time. The decoder is arranged to require two repetitive identical data messages before the decoder is placed in a condition to be enabled. Prior to the time a specific premium program will begin, a light code will be transmitted and will be effective to turn on a light emitting diode on the front of the decoder if the decoder has been properly programmed. This enables the subscriber to advise the transmitting entity if he has ordered a particular program and if the device is apparently not enabled to receive it. When the program starts, a program message will be transmitted on the data subcarrier, which program message activates the described audio and video decoding circuitry.

Figure 2:
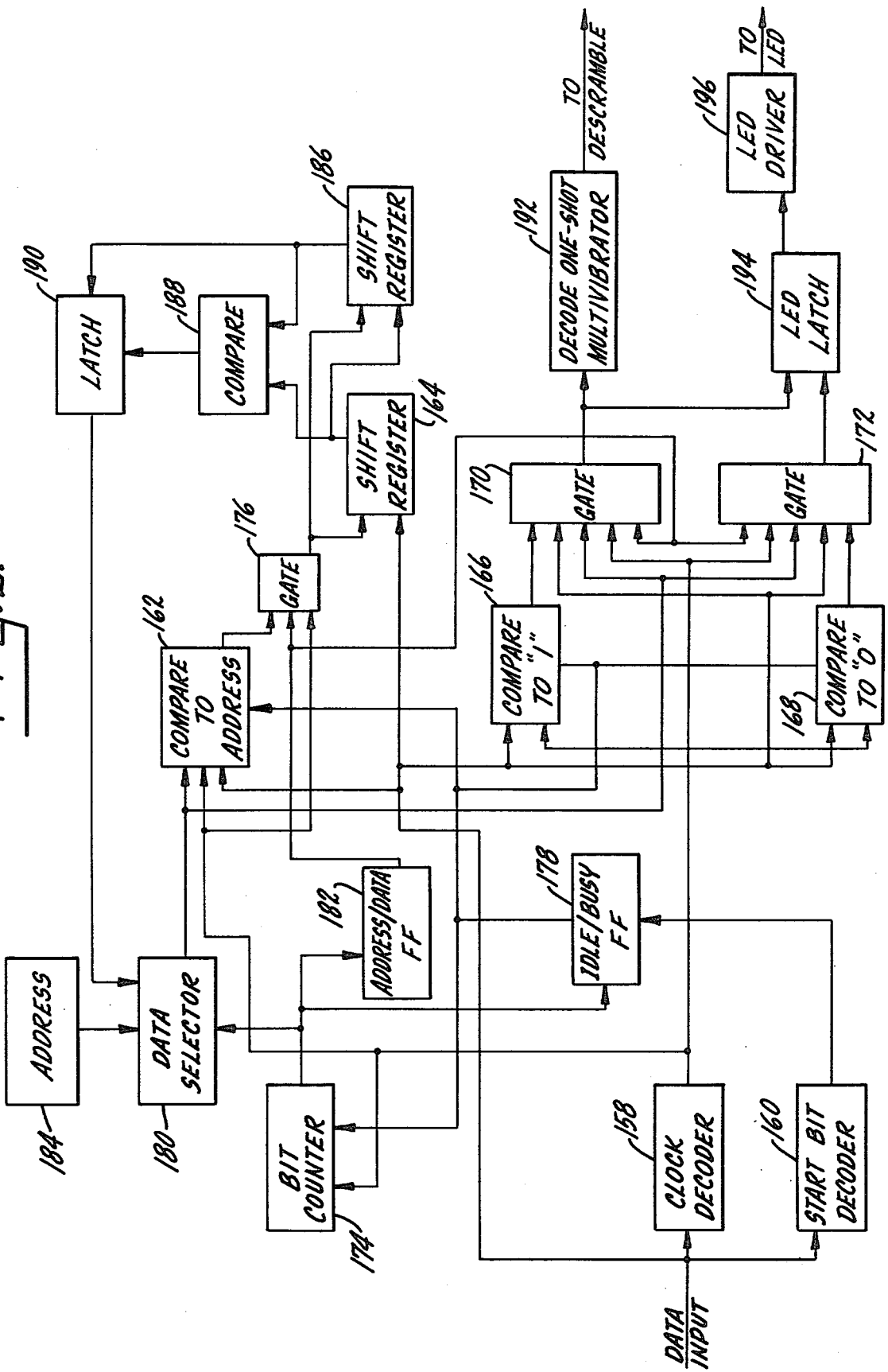
FIG. 2 is a schematic illustration of the data processing portion of the converter-decoder.

Data processing circuit 156 in FIG. 1 is illustrated in detail in FIG. 2. The data input from buffer amplifier 154 is connected to a clock decoder 158 and a start bit decoder 160. The data input information is also connected to the following additional logic circuits; the compare-to-address circuit 162, a shift register 164; a compare to "one" circuit 166, a compare to "zero" circuit 168; and gates 170 and 172 connected respectively to compare circuits 166 and 168.

The output from clock decoder 158, which will be a series of pulses, one in the middle of each received information bit, is connected to a bit counter 174, compare to address circuit 162, a gate 176 and the described compare and gate circuits 166, 168, 170 and 172. The output from start bit decoder 160, which recognizes the initial four-bit wide start signal, is connected to an idle/busy flip-flop 178 which provides a reset signal for bit counter 174, compare to address circuit 162 and compare circuits 166 and 168.

The output from bit counter 174 which counts each bit as it is received, is connected to a data selector 180 and an address/data flip-flop 182, as well as providing a reset signal for idle/busy flip-flop 178 at the end of a received data message. The particular subscriber's address is wired in address circuit 184 and is connected to data selector 180. Thus, the output from data selector 180 will be the address in serial form which in turn is connected to compare-to-address circuit 162, as well as to gates 170 and 172.

As indicated previously, received data must be duplicated before it is termed acceptable. Thus, there is a second shift register 186 having its output along with that from shift register 164 connected to a compare circuit 188 which in turn is connected to a latch 190. The output from latch 190 is connected to data selector 180.

The circuit is completed by a decode one-shot multivibrator 162 connected to the output of gate 170 and an LED latch circuit 194 connected to the output of gate 172. The output of gate 170 is also connected to latch 194. The output from decode circuit 192 is connected to filter 90, audio bypass switch 132, and multivibrator 112, all indicated in FIG. 1. The output from LED latch 194 is connected through a driver circuit 196 to an LED indicator located on the front of the unit.

As indicated above, the initial data input, the top signal in FIG. 3, is a message having a four-bit wide start signal, a 22-bit address and a four-bit data ending portion. This message places the decoder in an enable position if the subscriber has requested premium programming. The start bit decoder 160, through idle/busy flip-flop 178 will place the circuit in a condition to receive the following message. Clock decoder 158 provides clock signals at the middle of each bit. The timing clock signals are provided to bit counter 174 which provides a binary number at its output corresponding to the then current bit. The output from bit counter 174 is connected to data selector 180 which provides an output of the address from circuit 184 for a particular subscriber in serial form and this is connected to compare to address circuit 162 and gates 170 and 172. The output from bit counter 174 is also connected to address/data flip-flop 182 which has a low output during the address portion of the message and a high output during the data portion of the message. In compare-to-address circuit 162 the received address information is compared with the address from data selector 180 at a rate determined by the signals from clock decoder 158. Assuming a correct address, the output of circuit 162 will go high.

When address/data flip-flop 182 goes high, indicating the data portion of the message, and assuming a correct address, clock pulses are passed by gate 176 to shift registers 164 and 186. Shift register 164 receives the data from the input circuit and this information is stored in the shift register. A subsequent message will cause the data in shift register 164 to be transferred to shift register 186 with compare circuit 188 then comparing the data stored in both shift registers. If the data messages are the same, this information is transferred from circuit 188 to latch 190 where the information is stored to be released by data selector 180 as described hereinafter. Thus, the data stored in the latch will indicate what premium programming a particular subscriber is to receive. This information is only stored after two repetitive identical messages are received by the described circuitry.

Prior to the beginning of a premium program transmission, a light signal, the middle signal in FIG. 3, will be transmitted and this will consist of the described start pulse followed by an address of all zeros and appropriate data information for the upcoming program. If a particular subscriber has been enabled for this program, his LED will be lit. The incoming message, after the start bit, along with clock signals from clock decoder 158, will be received by compare circuit 168 which has a wired-in address of all zeros. A message address of all zeros will provide a high output from compare circuit 168 to gate 172. The other inputs to gate 172 include a signal from address/data circuit 182 indicating that the address portion of the message is over and the data portion is now present; a clock signal from the clock decoder 158; the stored data from latch 190 provided through data selector 180; and the actual received data. In the illustrated example, the information portion of the message has four bits. Correspondence between any one of the four bits stored in latch 190 and the same sequential bit in a message having an address of all zeros is a sufficient data comparison. If all signals in proper form are present at the input of gate 172, the gate will provide a signal which will cause LED latch 194, through latch driver 196, to light the indicator lamp on the decoder indicating that it is ready to receive a particular premium program.

To enable the decoder a message consisting of an address of all "ones" and data bits representing the program to be broadcast, is compared in circuit 166 having a wired-in address of all ones. Assuming an all "one" message is received by gate 170 which will receive the same additional inputs as described above in connection with gate 172, and assuming the subscriber has been programmed for the particular following transmission, and assuming that the other appropriate inputs are all present at gate 170, then the gate will provide an output signal to decode circuit 192. The output from decode circuit 192 will institute the decoding operation through filter 90 and audio bypass 132. Also, the LED will be turned off by the connection between gate 170 and LED 194.

Although the invention has been described in connection with over-the-air subscription television, it has application in other areas, for example cable television and microwave distribution systems.

Whereas the preferred form of the invention has been shown and described herein, it should be realized that there may be many modifications subsitutions and alterations thereto within the scope of the following claims.

The embodiments of the invention in which an exclusive property or privilege is claimed are defined as follows:

1. A TV decoder for processing TV audio and video signals in which the audio information is received on an audio subcarrier including filter means for separating audio carrier information and video carrier information signals, demodulating means for separating the audio carrier information signal from the audio information subcarrier, means for multiplying the audio information subcarrier to raise it to the frequency of the audio carrier information signal and means for recombining the video carrier information signal with the increased frequency audio information subcarrier.

2. The decoder of claim 1 further characterized by and including data process means for controlling said multiplying means.

3. A TV decoder for processing encoded audio and video signals in which the TV program audio information is received as an audio subcarrier, including means for decoding the video signal, filter means for separating video and audio carrier information signals, demodulating means for separating the audio carrier information signal from the audio information subcarrier, means for multiplying the audio information subcarrier to raise it to the frequency of the audio carrier information signal, and means for recombining the video carrier information signal with the increased frequency audio information subcarrier.

4. The TV decoder of claim 3 further characterized in that said TV signal includes a decoder enabling audio subcarrier, and means for enabling said multiplying means in response to said decoder enabling audio subcarrier.

5. The TV decoder of claim 4 further characterized by and including audio bypass means having inputs of the audio carrier information signal and said increased frequency audio information subcarrier, said audio bypass means being operated in response to said decoder enabling audio subcarrier.

6. The TV decoder of claim 3 further characterized in that said audio carrier information signal includes signal components for effecting decoding of said video signal.

7. The TV decoder of claim 3 further characterized in that said video encoding is in the form of applied amplitude modulation on both the audio and video carrier information signals, with the level of said amplitude modulation being greater on the audio carrier information signal than on the video carrier information signal.

8. The TV decoder of claim 3 further characterized in that said multiplying means includes first and second doubling circuits, and a filter connected therebetween.

9. A TV decoder for processing amplitude modulated encoded audio and video carrier information signals in which the TV program audio information signal and a decoder enabling signal are each received as audio subcarriers, including decoder enabling means responsive to said decoder enabling subcarrier, means for detecting the amplitude modulation on the audio carrier information signal, means for applying said detected audio carrier information signal amplitude modulation to said encoded video carrier information signal to decode it, filter means for separating the video and audio carrier information signals, demodulating means for separating the audio carrier information signal from the audio information subcarrier, means for multiplying the audio information subcarrier to raise it to the frequency of the audio carrier information signal, and means for recombining the video carrier information signal with the increased frequency audio information subcarrier.

10. The TV decoder of claim 9 further characterized in that said decoder enabling means is connected to and controls operation of said means for applying said detected audio carrier information signal amplitude modulation to said encoded video carrier information signal to decode it and said means for multiplying the audio information subcarrier to raise it to the frequency of the audio signal.

11. The TV decoder of claim 9 further characterized by and including audio bypass means having inputs of said audio carrier information signal and said increased frequency audio information subcarrier, said audio bypass means being operable in response to said decoder enabling audio subcarrier.

* * * * *